UNITED STATES PATENT OFFICE.

ALLERTON S. CUSHMAN, OF WASHINGTON, DISTRICT OF COLUMBIA.

INHIBITIVE PIGMENT AND METHOD OF MAKING SAME.

987,965.  Specification of Letters Patent.  Patented Mar. 28, 1911.

No Drawing.  Application filed December 27, 1910. Serial No. 599,271.

*To all whom it may concern:*

Be it known that I, ALLERTON S. CUSHMAN, a citizen of the United States, residing at Washington, in the District of Columbia, have invented certain new and useful Improvements in Inhibitive Pigments and Methods of Making the Same, of which the following is a specification.

During the past few years many investigations have been made into the causes underlying the corrosion of iron and steel, and as a result of these investigations it is now well known that many pigments when applied to the surfaces of these metals exert either a stimulating action in inducing corrosion, or a retarding or inhibiting action. The causes underlying these two effects are now well known. For instance, a pigment which is precipitated from solution may by occlusion or subsequent imperfect washing carry with it traces of free acids, or salts, such as soluble sulfates or chlorides, which freely ionize acid radicals. When such pigments are applied to iron stimulation of corrosion occurs. Again, pigments which form galvanic couples with iron and which are also good conductors of electricity may set up electrolysis and induce corrosion; such pigments are generally of the carbonaceous group. On the other hand, the so-called inhibitive pigments are generally those which are very slightly soluble and which also contain either basic (hydroxyl) groups or chromic acid groups. The latter are the better inhibitors of corrosion, and the use of pigments such as zinc chromate, which is slightly soluble and ionizes a chromic acid radical, has given excellent results in practice for the protection of iron and steel. For further information on the subject of inhibitive pigments, reference is made to Bulletin No. 35, U. S. Department of Agriculture, A. S. Cushman. It is also now well known that the chromate pigments, such as zinc chromate, lead chromate and other metallic chromates, vary widely in their inhibitive values. Such pigments, when prepared under acid conditions or in a manner otherwise faulty, may contain acids or salts of such character as to neutralize their normal inhibitive effect, or even to impart to them stimulative tendencies.

This invention relates to methods of treating pigments whereby they may be freed from stimulative acids or salts, if such be present, and also rendered positively inhibitive, or improved as to their inhibitive qualities, by incorporating with the pigment particles, and particularly with the surface portion of such particles, the chromic acid radical.

To carry the method into effect I may proceed as follows: About 15 parts of potassium or sodium bichromate, or other soluble salt containing the chromic acid radical, are dissolved in 100 parts of water, and to this solution is added the pigment to be chromated. The proportion of pigment to solution is immaterial, provided the pigment is thoroughly wet by the solution. The concentration of the solution may also be widely varied. The mass is thoroughly stirred, and the chemical action may be expedited by heating. The chromate solution may be acid, neutral or alkaline, but should be as nearly as practicable free from strong mineral acids, such as hydrochloric or sulfuric acids or their soluble salts. After treatment for a suitable time, depending upon the nature of the pigment, the solution is eliminated by filtration or otherwise, and the pigment dried, with or without previous washing with water. Examination of the pigment, after treatment as above, shows that the surfaces of the particles contain the chromic acid radical. The superficial character of the action may be shown in the case of most pigments by rubbing the treated pigment in a mortar or otherwise crushing or abrading the particles, when the differing colors of the original and modified portions of the pigment particles will be made apparent. Certain pigments, by sufficiently prolonged treatment, may be converted completely into chromate, but such conversion is not as a rule economical or desirable. The time of treatment will of course vary according to the character of the pigment treated.

The pigments used are such as are capable of taking up at least a small proportion of the chromic acid radical, either physically or chemically, usually chemically. Hence the pigments treated are generally basic in character or contain metallic oxids, as for example zinc oxid, white or red lead, litharge, calcium carbonate, slag pigments, oxids of iron, etc.

Pigments containing in large proportions the strong mineral acids, as sulfuric or hydrochloric acids, or their salts, are not well adapted for treatment by this method whether for partial or for complete conversion, for the reason that in so far as the pigment may be chromated the reaction is accompanied by the liberation of the mineral acids or the formation of soluble salts of such acids, the effect of which would be to impart stimulative properties to the pigment.

As an example of the invention, red lead subjected to the action of a chromate solution as above for a period of ten to twenty minutes is superficially converted into chromate and the resulting composite pigment is found to possess a much finer color value than the original red lead in conjunction with a very much greater inhibitive value. The inhibitive effect of other pigments is similarly improved. This increased inhibitive effect is due in part to the introduction into the constituent pigment particles of the chromic acid radical, and in part also to the neutralization of the strongly stimulative mineral acids which are usually present in small proportions in pigments formed by precipitation methods. For this latter reason, it is found advantageous to treat by this method even chromate pigments, as lead or zinc chromates, inasmuch as their inhibitive value may thereby be increased or their stimulative effect corrected. The method is also applicable to the treatment of pigments, such as the ochers, etc., which are normally stimulators of corrosion, the effect in such case being to render the pigment positively inhibitive by providing the pigment particles with a superficial coating having inhibitive value. In the case of calcium carbonate, basic slags and other pigments which are objectionable for use with linseed oil on account of their action in saponifying the oil and thereby preventing or checking the formation of linoxin, the treatment above described presents especial advantages, inasmuch as it not only reduces the objectionably basic character of the pigment, but the chromic acid radical also directly aids in the formation of linoxin.

It is well known that zinc chromate, either in dry form or as a paste or in the ready-mixed state, has been mixed with paints for use on iron or steel, but such procedure is quite unrelated to the object of the present invention, which is to impart increased inhibitive value to the pigment particles themselves.

I claim:

1. The method of preparing pigments having inhibitive properties, which consists in subjecting a pigment substantially free from sulfates or chlorids to the action of the chromic acid radical.

2. The method of preparing pigments having inhibitive properties, which consists in subjecting a pigment substantially free from sulfates or chlorids to the action of the chromic acid radical and arresting the reaction before the conversion into chromate is complete.

3. The method of treating pigments to improve their inhibitive value or to impart inhibitive properties thereto, which consists in superficially chromating pigment particles substantially free from sulfates or chlorids.

4. The herein-described inhibitive pigment, comprising particles of pigment material substantially free from sulfates or chlorids and incompletely chromated.

5. The herein-described inhibitive pigment, comprising particles of pigment material substantially free from sulfates or chlorids and superficially chromated.

6. The herein-described inhibitive pigment, comprising particles of an oxid pigment substantially free from sulfates or chlorids and superficially chromated.

In testimony whereof, I affix my signature in presence of two witnesses.

ALLERTON S. CUSHMAN.

Witnesses:
Jos. H. Blackwood,
Clinton P. Townsend.